Aug. 14, 1956 W. A. RAY 2,759,070
MERCURY SWITCH BIMETAL THERMOSTAT
Filed July 20, 1953
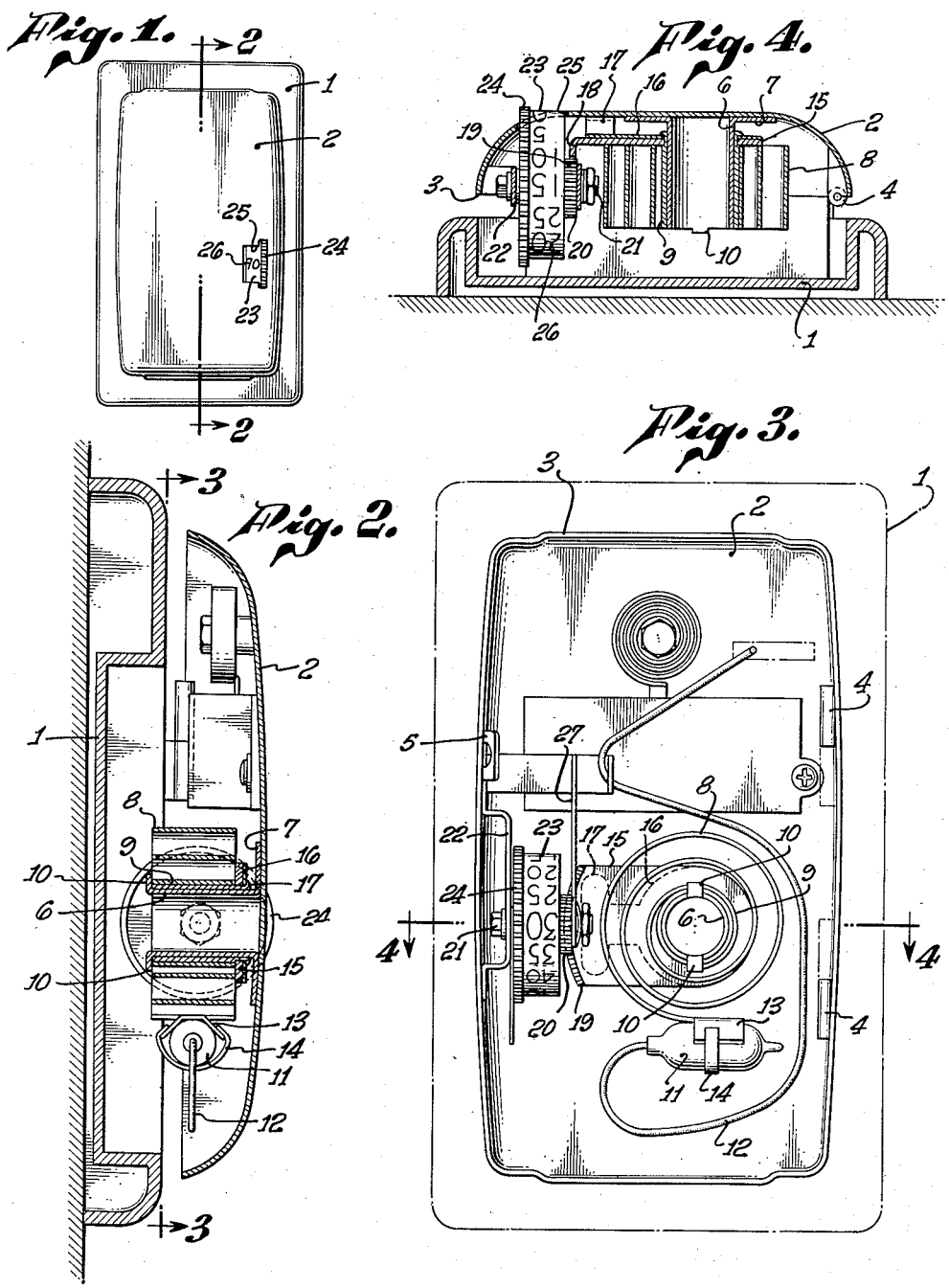
INVENTOR.
WILLIAM A. RAY
BY
John Flam
ATTORNEY.

United States Patent Office 2,759,070
Patented Aug. 14, 1956

2,759,070

MERCURY SWITCH BIMETAL THERMOSTAT

William A. Ray, North Hollywood, Calif., assignor to General Controls Co., a corporation of California Application July 20, 1953, Serial No. 368,899

6 Claims. (Cl. 200—138)

This invention relates to bimetal thermostats, and especially of the type utilizing a mercury switch for performing a control function.

Such bimetal thermostats are often used to turn heating or cooling systems on and off in response to temperature variations in a room or space. For example, in a heating system for a room, the thermostat causes a control circuit to be established for opening a gas valve when the temperature in the room is lowered to a definite limit. Similarly, the thermostat interrupts the circuit for closing the valve when the room temperature reaches a definite upper limit.

An adjusting lever or wheel is commonly used to adjust the thermostat so that it responds at a chosen temperature. Such adjustment is usually effected by moving the bimetal element of the thermostat.

It is one of the objects of this invention to provide an improved thermostat of this character.

It is another object of this invention to provide rapid flow of heat between bimetal element and the circumambient atmosphere. In this way, the response of the thermostat to variations in temperature is effected rapidly.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Figure 1 is a front elevation of a thermostat structure incorporating the invention;

Fig. 2 is an enlarged longitudinal sectional view taken along a plane corresponding to line 2—2 of Fig. 1;

Fig. 3 is a view taken along a plane corresponding to line 3—3 of Fig. 2; and

Fig. 4 is a cross sectional view taken along a plane corresponding to line 4—4 of Fig. 3.

In the present instance, the thermostat structure is shown as incorporated in a wall device located in a room for controlling either a heating unit or cooling unit. Control circuits are affected by the thermostat so as to operate electromagnetic valves, or other control apparatus, in the usual manner.

Thus the thermostat includes a base 1 having a thin sheet metal cover member 2, which may be made of stainless steel. This sheet metal 2 is shown as of shell form. The edge 3 of the cover member 4 is spaced from the base 1 so that the circumambient atmosphere can circulate through the space defined by the interior of the cover 2. Conveniently, the cover 2 may include the hinge ears 4 by the aid of which it may be mounted upon the base 1. A spring catch 5 (Fig. 3) is mounted adjacent one edge of the member 2 for releasably holding the cover member in the position of Figs. 1, 2 and 3. The cover member carries substantially all of the operating parts of the thermostat.

Mounted upon the inside of the cover member 2 is a tubular or shell-like post or support 6. This tubular member is also made of metal, such as stainless steel, and is maintained in good heat conducting relationship with the metal member 2. For that purpose the member 6 is provided with a relatively large base flange 7, preferably welded to the member 2.

This post 6 serves as a stationary support for a bimetal element. This bimetal element 8 is indicated as a coil. The inner end of the coil is firmly attached to a band or bushing 9. This band is mounted for angular adjustment upon the tubular member 6. The tubular member 6 has ears 10 at its free end which are turned outwardly, as shown most clearly in Fig. 2, for restraining the band 9 from removal with respect to the member 6.

The other or free end of the bimetal member 8 carries a mercury switch 11, having the usual tubular sealed body, in which electrodes and mercury are enclosed. This mercury switch 11 may have its electrodes connected to a twin lead 12 extending to appropriate terminals mounted upon the base 1.

As shown most clearly in Figs. 2 and 3, switch 11 is held in place on a saddle 13 formed at the end of the bimetal 8. Holding the switch 11 in place in the saddle is a thin strip 14 attached to the edges of the saddle 13.

By adjustment of the band 9 angularly, the angular position of the switch 11 may also be adjusted. In this way the amount of flexure of the bimetal member 8 necessary to operate the switch 11 for opening or closing it depends upon the angular adjustment of the band 9. Thus the angular adjustment can be varied to correspond with the desired temperature at which the switch 11 is to operate.

The band 9 is in intimate heat transfer relationship with the post or shell 6. This post in turn is in intimate heat exchange relationship with the metal cover 2. Since the band 9, post 6 and cover 2 are all made of good heat conducting material, the flow of heat to the bimetal member 8 is facilitated.

Angular adjustment of the band 9 is effected by the aid of a plate 15 mounted upon the reduced inner end of the band 9. This mounting is such that there is a strong frictional engagement between the plate 15 and the band 9. This frictional engagement makes it possible to calibrate the thermostat during the process of testing. Lying back of the band 9 is a spring member 16 having extensions 17 frictionally engaging the inner surface of the member 2 (Fig. 4). Furthermore, the inner end of the band 9 is upset, as indicated at 17, for maintaining the plate 15 and the spring member 16 in position.

The plate 15 has a bent up portion 18. The upper edge of this bent up portion is arcuate and formed with a gear provided with teeth to form a gear segment 19. This gear segment is arranged to be operatively engaged by a pinion 20 mounted upon a control shaft 21. This control shaft is carried for rotation by the aid of a bracket 22 attached to the cover member 2, as well as by another bracket 27 also supported by member 2. The shaft also carries a manually actuated index wheel 23. This index wheel 23 has a knurled flange 24 which extends through an opening 25 in a cover member 2. This opening 25 is wide enough to permit viewing of the numerals 26 marked upon the periphery of the index wheel 23. For example, in Fig. 1 the number 70 appears in the window formed by the aperture 25 indicating that the switch 11 is intended to operate when the temperature reaches 70°.

The inventor claims:

1. In an adjustable thermostat: a metal support; a tubular member rigidly attached to the support in good heat transfer relationship thereto; a metal band frictionally engaging and rotatably mounted on the tubular member; a bimetal member having an end wrapped about and rigidly attached to said band; and means for moving said band angularly about said tubular member.

2. In an adjustable thermostat: a metal support; a tubular member rigidly attached to the support in good heat transfer relationship thereto; a metal band frictionally engaging and rotatably mounted on the tubular member; a bimetal member having an end wrapped about and rigidly attached to said band; means for moving said band angularly about said tubular member; and a mercury switch carried by the other end of the bimetal member.

3. In an adjustable thermostat: a base; a cover for the base; a tubular member having an enlarged outwardly extending flange at one end and abutment means extending radially outwardly at the other end; the enlarged flange being rigidly secured on the inside of the cover; a metal band frictionally engaging the tubular member and rotatable about the axis thereof; a plate extending transversely of the band secured at that end of the band located closer to the enlarged flange and extending along the inside of said cover; a convoluted bimetal member having its inner end wrapped about and secured to said band; a mercury switch carried on the outer end of said bimetal member; and means cooperable with said plate for adjusting the angular position thereof to correspondingly vary the angular position of said switch.

4. In an adjustable thermostat: a base; a cover for the base; a tubular member having an enlarged flange rigidly affixed in place on the inside of the cover; a metal band frictionally engaging and rotatably mounted upon the tubular member; a convoluted bimetal member having its inner end encircling the band and secured thereto; a mercury switch carried by the outer end of the band; an arm secured to the band and having means forming a gear segment extending arcuately about the axis of said tubular member; and a rotatable manually manipulable knob having a gear means engageable with the gear segment for adjusting the position of said band.

5. In an adjustable thermostat: a base; a cover for the base; a tubular member having an enlarged flange rigidly affixed in place on the inside of the cover; a metal band frictionally engaging and rotatably mounted upon the tubular member; a convoluted bimetal member having its inner end encircling the band and secured thereto; a mercury switch carried by the outer end of the band; a flexible arm secured to the band and having means forming a rack extending arcuately about the axis of said tubular member; a manually manipulable knob rotatable about an axis normal to the axis of said tubular member, said knob having a pinion gear engageable with the rack for adjusting the position of the band; and resilient means urging the rack into engagement with said pinion gear.

6. In an adjustable thermostat: a base; a cover for the base, and having an aperture; a flexible plate within the cover mounted for angular movement about an axis transverse to the cover; a bimetal member connected to the plate for angular movement therewith; a manually manipulable knob mounted within the cover for rotation about an axis normal to the axis of said tubular member, and having a portion accessible for manipulation through said cover opening; a pinion carried by the knob; said plate having means remote from said axis forming a gear segment extending arcuately about said axis, and between said cover and said pinion; and a spring between the plate and the cover urging said gear segment into engagement with said pinion.

References Cited in the file of this patent

UNITED STATES PATENTS

| 1,881,950 | Rayfield | Oct. 11, 1932 |
| 1,975,856 | McCabe | Oct. 9, 1934 |
| 2,060,713 | Wright et al. | Nov. 10, 1936 |
| 2,171,861 | McCabe | Sept. 5, 1939 |